G. MACBETH.
CASH REGISTER.
APPLICATION FILED JAN. 19, 1912.
1,130,182.
Patented Mar. 2, 1915.
3 SHEETS—SHEET 1.
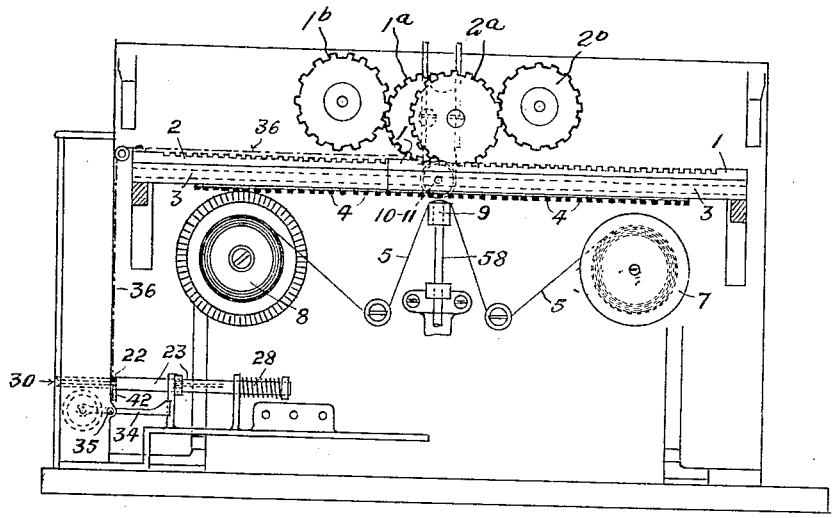
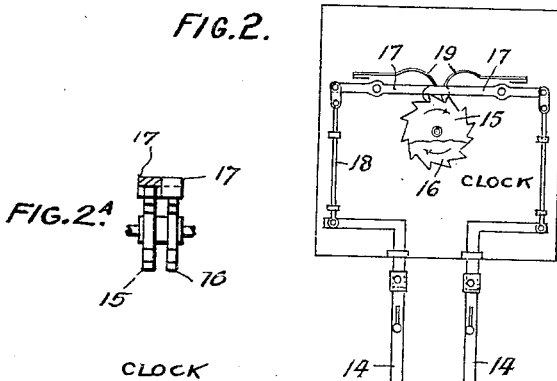
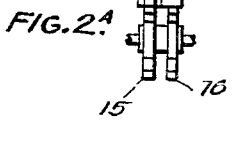
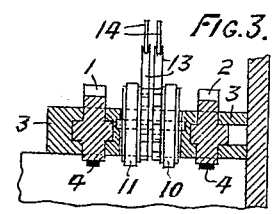
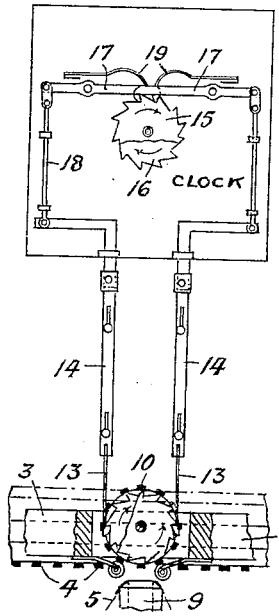
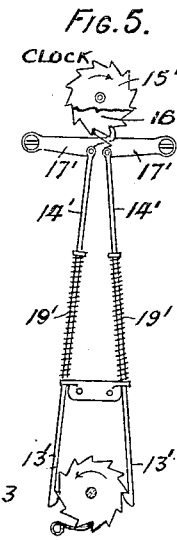
WITNESSES
INVENTOR
George Macbeth
By
Atty.

G. MACBETH.
CASH REGISTER.
APPLICATION FILED JAN. 19, 1912.
1,130,182.
Patented Mar. 2, 1915.
3 SHEETS—SHEET 2.
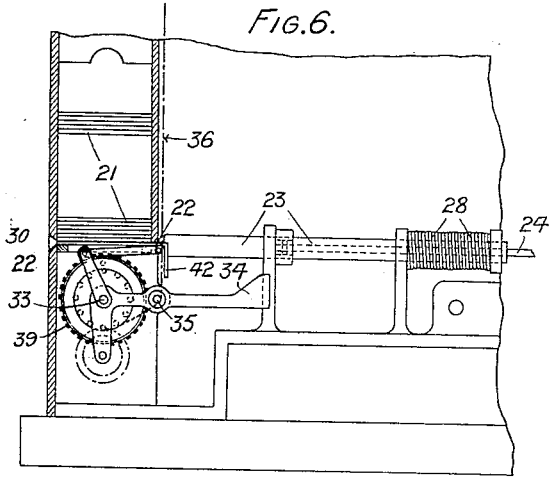
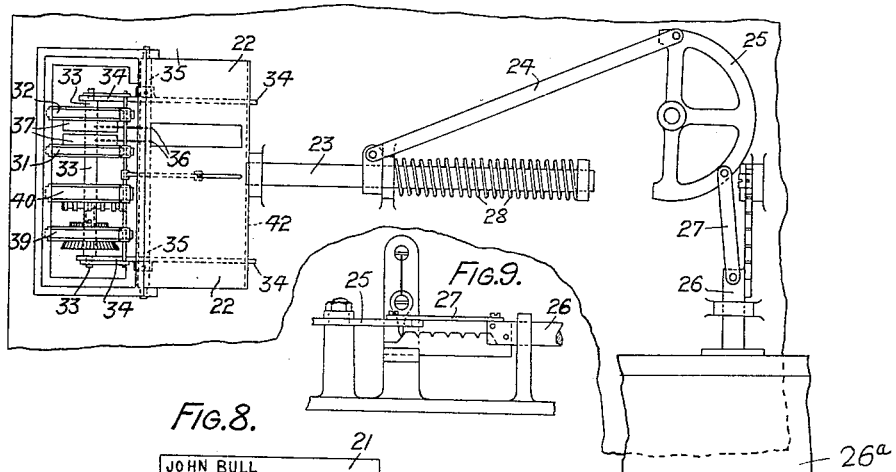
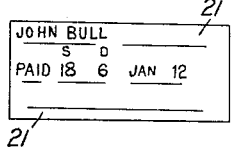
WITNESSES
INVENTOR
George Macbeth
By
Atty.

G. MACBETH.
CASH REGISTER.
APPLICATION FILED JAN. 19, 1912.
1,130,182.
Patented Mar. 2, 1915.
3 SHEETS—SHEET 3.
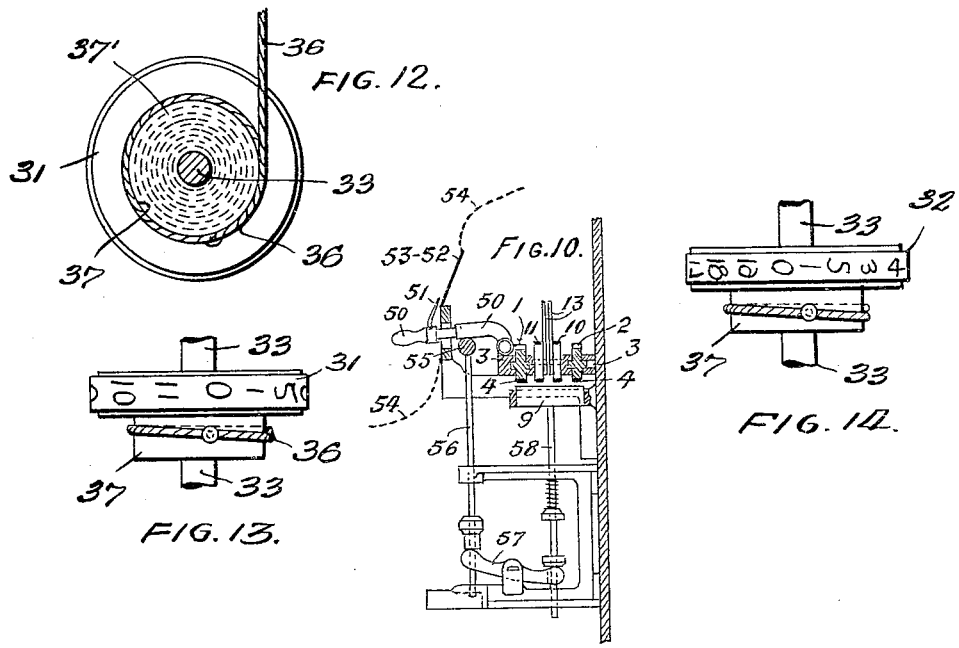
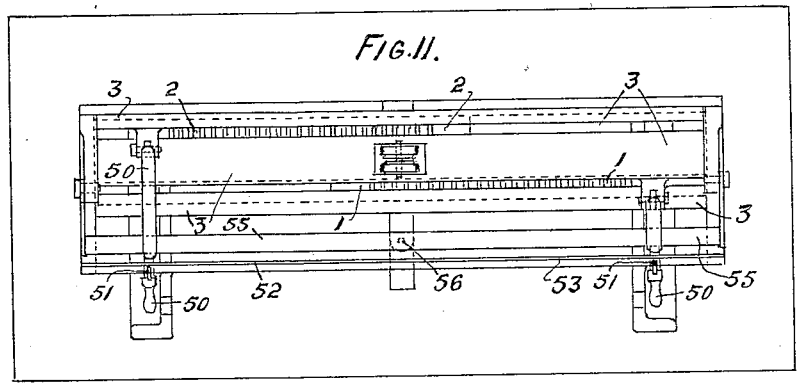
WITNESSES
W. Abramson
V. M. Hudson
INVENTOR
George Macbeth
By
Atty.

UNITED STATES PATENT OFFICE.

GEORGE MACBETH, OF LIVERPOOL, ENGLAND.

CASH-REGISTER.

1,130,182.  Specification of Letters Patent.  Patented Mar. 2, 1915.

Application filed January 19, 1912. Serial No. 672,115.

*To all whom it may concern:*

Be it known that I, GEORGE MACBETH, a subject of the King of England, residing at Liverpool, in the county of Lancaster, England, have invented certain new and useful Improvements in or Connected with Cash-Registers, of which the following is a specification.

This invention has reference to apparatus, used for registering or recording moneys paid by a customer or other; and in which the records of moneys (say pence and shillings) received are marked, with other data, such as time data, on a strip of paper, within the machine, which is moved automatically, and the records are marked automatically on the strip, when the machine is used or actuated.

The invention is hereinafter described in connection with a known type of "register" or machine having a recording mechanism, and record strip, which is shown in the accompanying drawings.

In these drawings, Figure 1 is a front elevation showing the internal parts of the machine, and Figs. 2, 2ª and 3, are details showing the time recording mechanism used in this machine, and the parts associated with it; while Fig. 4 shows a part of a strip of tape containing the records or registrations effected under this invention. Fig. 5 shows a modification of the mechanism shown in Figs. 2 and 3. Fig. 6 is an elevation, and Fig. 7 a plan of the ticket marking and delivering mechanism, and Fig. 8 shows one of the tickets. Fig. 9 shows a check mechanism hereinafter explained. Fig. 10 is a side elevation in section and Fig. 11 is a plan of a machine showing the hand operated parts and actuating means. Fig. 12 is an enlarged side view of a spring controlled mechanism for printing the amounts on the tickets. Figs. 13 and 14, respectively, are plan views of the "pence" and "shillings" printing mechanisms.

By this invention, by the simple depression or elevation of the vibratory actuating lever or "key", 50 of the type bars 1 and 2, after these bars have been set, both the money recording, and also the time recording are automatically effected, upon the strip of paper 5 simultaneously; and furthermore, under this invention there is used in combination with the above, a machine ticket delivering and printing mechanism adapted to be operated by the drawer of the apparatus when actuated, and by the said movable cash recording parts.

In this machine there is combined with the parts 1 and 2, which carry the money printing types, which are adapted to slide or be slid and moved along the main slide frame 3, a set of parts provided with type—preferably type wheels moved and set by a clock or time keeping mechanism (such as shown in Figs. 2 and 3), and so arranged in relation to the money type 4 carried by the sliding bars 1 and 2, that when the recording act is effected, records or registrations or money received, and the time, or an approximate time of receipt is marked and recorded upon the strip of paper 5; and this is effected by the simple depression or elevation of a lever or arm 50, by which the slides are moved to and fro, so as to bring the right money types 4 over the part of the strip of paper 5, which is to receive this record. These two records or registrations are advantageously made or entered on the strip 5 transversely in line, as shown in Fig. 4.

1ª, 2ª designate toothed wheels which gear with the bars 1, 2 respectively, and serve to transmit the movements of such bars to indicator disks 1ᵇ, 2ᵇ, which serve to exhibit the amounts recorded. In this case, the shillings are to the left hand side, the pence on the right hand side, and the time in the space between these columns and the money; and time records may be marked in different colors.

The tape 5, between the taking off and taking on rollers 7 and 8, passes over a pad 9, and this pad is adapted to be raised and lowered against the types.

The time type wheels are designated 10, 11; 10 being the hour type wheel, and 11 the minute type wheel, and both of these types are in the same plane below,—where they come upon the pad 9,—as the types on the bars 1 and 2; thus when the pad 9 is lifted up in the act of registration, and when using the machine the tape 5 is brought into contact with the types 4 as well as the types 10 and 11, and mark the tape 5. The type wheels 10 and 11 are actuated by spring pawls 13 connected with the rods 14, and work up and down from the clock driven toothed wheels 15 and 16,—of which 16 is the hour wheel,—by pawls 17 and connecting rods 18; the pawls 17 are, normally pressed on to the teeth of the wheels 15 and 16 by springs 19. The wheels 15 and 16 will be revolved at the required rates to constitute hours and minutes, and the wheels 10, 11, rotated accordingly. For instance, the minute wheel 11 may be moved every five minutes, so that it will receive twelve actuations in an hour, and therefore twelve actuations to one actuation of the hour type wheel 10.

In the modification shown in Fig. 5, the pawls 13' are moved upward by spiral springs 19' connected to stops on the connecting parts 14', and these springs press the pawls 17' into engagement with the pawl or multiple cam wheels 15' and 16', similar to the springs 19 in Fig. 2.

An actuating handle 50 is attached to each of the type slides 1, 2, one to the right hand end of the one, and the other to the left hand end of the other; (see Figs. 10 and 11) and they each have a pointer 51 on them which works over money scales 52, 53, fixed on the face of the machine, of which 54 represents in dotted lines the outer front case. The slides 1, 2, with their types are slid to and fro to the required position, according to the money taken and to be recorded, over the pad 9; and when they have been moved to their position one or both of the levers 50 is or are, according as may be required, simply pressed down; and this acts on a rod 55 lying directly under the levers 50 for the whole width of the machine, to which is fixed the rod 56, which works on one end of a lever 57, the opposite end of which acts on a rod 58 on the upper end of which the pad 9 is fixed; so that when a lever or levers 50 is or are depressed, they lift the pad 9, and record strip 5, on to the types 4 of the bars 1 and 2 directly over it, and also on to the types of the time type wheels 10 and 11, and effect both records simultaneously, and automatically.

The tickets 21 are delivered by a slide or pusher 22 (Figs. 1, 6 and 7), actuated by or from the movement of the drawer 26ᵃ of the machine. In the case shown this slide 22 is moved by a rod 23 which is actuated by a connecting rod 24 (Fig. 7) and a quadrant 25 from the drawer or moving mechanism. Namely, in this case, the drawer 26ᵃ may be assumed to actuate the rod 26 which is coupled by the connecting rod 27 with the quadrant 25, and when the drawer is pulled out, the position of the parts would be that shown in Fig. 7, that is, the slide 22 will be in; while when the drawer is closed the quadrant 25 will be actuated the spring 28 compressed and the parts in the position shown in Figs. 1 and 6. When the drawer is pulled out, the spring 28 draws back the slide 22. The tickets 21 normally ride on the slide 22, and when this slide is moved back, and then forward again, it lets the ticket down in front of it, and then pushes it out and delivers it through the slot 30.

For printing the ticket 21, with the sum received, there are employed pence and shilling type wheels 31, 32, mounted on a spindle 33 carried in side levers 34 pivoted on the shaft 35. These type wheels 31, 32, are moved and set by the slides 1 and 2 through flexible bands or connections 36, so that as the slides 1 and 2 are moved in registering, so will the type disks 31 and 32 be revolved, and set to print the ticket correspondingly with the printing of the tape 5 by the types 4 of the bars 1 and 2. These flexible connections 36 are connected to spring drums 37 on the type wheels 31 and 32, so that they are revolved in one direction by the connections 36, and in the opposite direction they are moved by the springs 37' in the wheels or drums 37. The spindle 33 also carries two other type wheels 39 and 40, which are for marking the days and months respectively on the ticket 21 in the manner shown in Fig. 8; and these type wheels 39 and 40 will be adapted to be set through the medium of pins 39ᵃ and 40ᵃ respectively according to the month and date as required in any known way, such as is used in connection with dating type wheels or instruments. Thus, the sum paid and the date of payment is marked automatically on every ticket ejected from the apparatus.

The axle 33 and the whole of the type wheels will be moved up, when the types are brought into contact with the ticket surface, by tipping the levers 34 about the axis 35, namely, when the slide 22 moves inward and the drawer is pulled out (and the slide itself under the tickets 21), the pendant part 42 of the slide will strike the inclined ends of the levers 34, and so press this end of the levers down, and the types into contact with the tickets. When the drawer is moved in again, after the lowermost ticket has been printed, the part 42 moves the levers 34, and the type wheels move away from the ticket; and the printed ticket is ejected, as described.

To prevent the drawer of the register being moved in the opposite direction to which it is commenced to move, unless a complete stroke is formed, a mechanism as illustrated in Fig. 9, is used in connection with it to accomplish this object. This means is shown used in connection with the rod 26 shown in Fig. 7.

What is claimed is:—

1. In a recording apparatus of the class described, the combination of cash recording mechanism including movable bars containing cash characters, disks disposed adjacent the movable bars, said disks having characters to indicate time of sale, automatic means for operating the disks, a tape for receiving the imprint of the cash and time characters, delivery and time recording mechanism including disks and a slide, means connecting the movable bars and the disks to rotate the latter in one direction, means for automatically rotating the latter disks in the opposite direction, a handle for operating movable bars and impressing the tape against the time and cash characters on the movable bars and the disks adjacent thereto, and a cash drawer for operating the slide to eject a ticket after the disks of the delivery mechanism have operated.

2. In a recording apparatus of the class described, the combination of cash registering and time recording mechanism, a movable ticket printing and delivering mechanism including rotating disks having characters to print the amount of and the time of sale, and a slide, belts between the cash registering and time recording mechanism to rotate the ticket printing disks in one direction, means for automatically rotating said ticket printing disks in the opposite direction, means for simultaneously operating the cash registering and time recording mechanism and the ticket disks, and means for operating the slide to eject a printed ticket.

3. In a recording apparatus of the class described, the combination of cash registering and time recording mechanism, ticket printing and delivering mechanism including printing disks, means between the cash recording mechanism and the disks to rotate the latter in one direction to set said disks, means independent of the aforesaid rotating means for reversely rotating the disks, a single actuating member for setting the cash registering mechanism and the disks, and to subsequently operate to record the amount of and the time of sale and print a ticket.

4. A cash and time recording apparatus comprising cash and time recording mechanism, an actuating member for setting the cash recording mechanism, and for subsequently actuating both the cash and time recording mechanisms for effecting the record; a ticket printing and delivering mechanism comprising a tiltable frame carrier fitted with cash and date wheels and with a lever, means between the cash and time recording mechanisms to rotate the wheels in one direction, means for subsequently rotating the wheels in the reverse direction, and a slide which engages the lever and tilts the frame; a spring and a drawer rod which is actuated by the spring in one direction and by hand in the other direction, and is connected to the slide, and is released by the actuating member, the movement effected by the spring, moving the slide over the lever and effecting the tilting of the frame carrier and the printing of a ticket, and the movement effected by hand restoring the parts to the inoperative position and the delivery of the printed ticket.

In testimony whereof I have signed my name to this specification in the presence of two subscribing witnesses.

GEORGE MACBETH.

Witnesses:
   SOMERVILLE GOODALL,
   HAROLD HOLMES.

Copies of this patent may be obtained for five cents each, by addressing the "Commissioner of Patents, Washington, D. C."